(12) United States Patent
Kawabata et al.

(10) Patent No.: US 9,031,234 B2
(45) Date of Patent: May 12, 2015

(54) ENCRYPTION DEVICE AND DECRYPTION DEVICE

(75) Inventors: Takeshi Kawabata, Kanagawa (JP); Hideo Shimizu, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 47 days.

(21) Appl. No.: 13/050,165

(22) Filed: Mar. 17, 2011

(65) Prior Publication Data

US 2012/0069997 A1   Mar. 22, 2012

(30) Foreign Application Priority Data

Sep. 21, 2010 (JP) ................................. 2010-210706

(51) Int. Cl.
*H04L 9/00* (2006.01)
*H04L 9/06* (2006.01)

(52) U.S. Cl.
CPC .............. *H04L 9/0631* (2013.01); *H04L 9/003* (2013.01); *H04L 2209/046* (2013.01); *H04L 2209/08* (2013.01); *H04L 2209/24* (2013.01)

(58) Field of Classification Search
USPC .............................. 380/45, 28, 29, 37, 44, 48
See application file for complete search history.

(56) References Cited

U.S. PATENT DOCUMENTS

| 2002/0015492 | A1* | 2/2002 | Ohmori et al. | 380/37 |
|---|---|---|---|---|
| 2007/0076864 | A1* | 4/2007 | Hwang | 380/29 |
| 2007/0177728 | A1* | 8/2007 | Lee et al. | 380/37 |
| 2008/0143561 | A1* | 6/2008 | Miyato et al. | 341/79 |
| 2008/0285743 | A1* | 11/2008 | Yokota et al. | 380/28 |
| 2009/0220071 | A1* | 9/2009 | Gueron et al. | 380/28 |
| 2010/0008498 | A1* | 1/2010 | Shirai et al. | 380/44 |
| 2010/0014664 | A1* | 1/2010 | Shirai et al. | 380/44 |

(Continued)

FOREIGN PATENT DOCUMENTS

| JP | 2000-66587 | 3/2000 |
|---|---|---|
| JP | 2000-162965 | 6/2000 |

(Continued)

OTHER PUBLICATIONS

Mangard, S. et al., "Power Analysis Attacks: Revealing the Secrets of Smart Cards," Chapter 6 (Differential Power Analysis), pp. 119-165, Springer, (2007).

(Continued)

*Primary Examiner* — Joseph P Hirl
*Assistant Examiner* — Sayed Beheshti Shirazi
(74) *Attorney, Agent, or Firm* — Finnegan, Henderson, Farabow, Garrett & Dunner, L.L.P.

(57) ABSTRACT

According to one embodiment, an encryption device includes a storage unit, an input unit, first to fourth partial encryption units, a generation unit, and an output unit. The first partial encryption unit calculates first intermediate data from input plain data to store in the storage unit. The generation unit generates a round key, which is used in calculations for the first intermediate data and N-th intermediate data, from the secret key. The second partial encryption unit calculates (i+1) th intermediate data from i-th intermediate data (i is smaller than N) and the round key to store in the storage unit. The third partial encryption unit performs an arithmetic operation including predetermined conversion for mixing the N-th intermediate data, and calculates (N+1)th intermediate data to store in the storage unit. The fourth partial encryption unit obtains encrypted data by performing an arithmetic operation including inverse conversion of the conversion on the (N+1)th intermediate data.

6 Claims, 15 Drawing Sheets

(56) References Cited

U.S. PATENT DOCUMENTS

| | | | |
|---|---|---|---|
| 2010/0086126 A1* | 4/2010 | Yokota et al. | 380/28 |
| 2010/0158241 A1* | 6/2010 | Gueron | 380/28 |
| 2010/0246828 A1* | 9/2010 | Johnston | 380/278 |
| 2010/0278340 A1* | 11/2010 | Yajima et al. | 380/255 |
| 2012/0069998 A1* | 3/2012 | Endo et al. | 380/46 |

FOREIGN PATENT DOCUMENTS

| | | |
|---|---|---|
| JP | 2000-182012 | 6/2000 |
| JP | 2002-520905 | 7/2002 |
| JP | 2002-247025 | 8/2002 |
| JP | 2005-92249 | 4/2005 |
| JP | 2010-166402 | 7/2010 |
| JP | 2011-2790 | 1/2011 |
| JP | 2011-175039 | 9/2011 |
| JP | 2012-23618 | 2/2012 |
| WO | WO 2006/112114 A1 | 10/2006 |
| WO | WO 2011/101994 A1 | 8/2011 |

OTHER PUBLICATIONS

Mangard, S. et al., "Power Analysis Attacks: Revealing the Secrets of Smart Cards," Chapter 9 (Masking), pp. 223-244, Springer, (2007).

Notice of Rejection issued by the Japanese Patent Office on Jul. 10, 2012, for Japanese Patent Application No. 2010-210706, and English-language translation.

Tsujimura et al., "Table-Network-Based FPGA Implementations of AES and Their Resistance Against Differential Power Analyses," IEICE Technical Report (Nov. 10, 2006), 106:33-40, and English-language Abstract.

\* cited by examiner

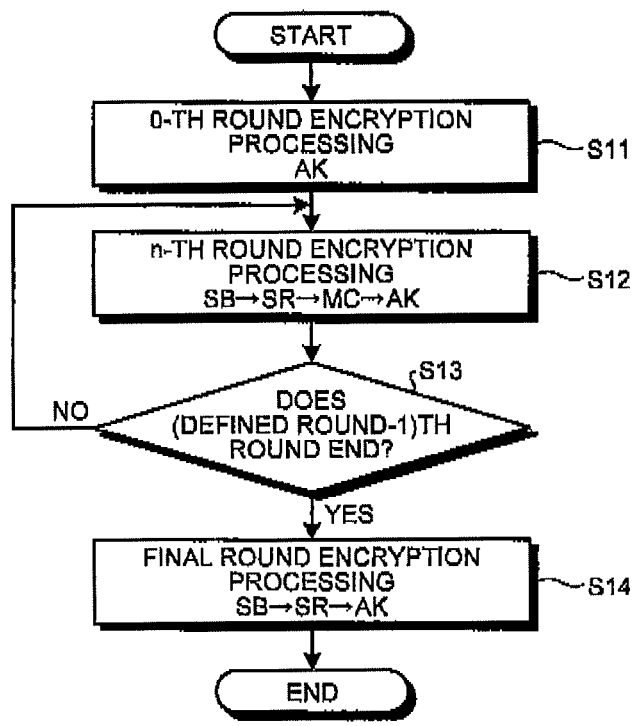
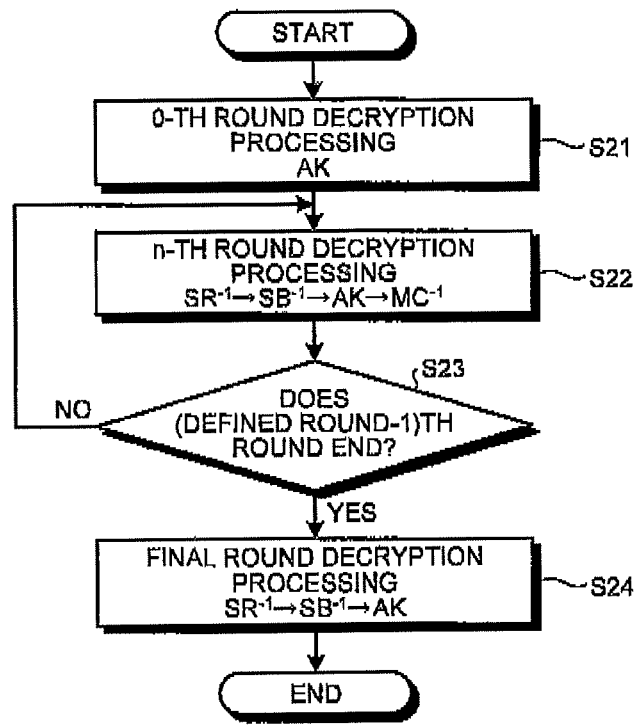

FIG.9

| CLOCK | CONTENT OF STORAGE DEVICE | PROCESSING CONTENT |
|---|---|---|
| 0 | P=P | |
| 1 | D1=P(+)k0 | AK |
| 2 | D2=MC(SR(SB(D1)))(+)k1 | SB, SR, MC, AK |
| 3 | D3=MC(SR(SB(D2)))(+)k2 | SB, SR, MC, AK |
| 4 | D4=MC(SR(SB(D3)))(+)k3 | SB, SR, MC, AK |
| 5 | D5=MC(SR(SB(D4)))(+)k4 | SB, SR, MC, AK |
| 6 | D6=MC(SR(SB(D5)))(+)k5 | SB, SR, MC, AK |
| 7 | D7=MC(SR(SB(D6)))(+)k6 | SB, SR, MC, AK |
| 8 | D8=MC(SR(SB(D7)))(+)k7 | SB, SR, MC, AK |
| 9 | D9=MC(SR(SB(D8)))(+)k8 | SB, SR, MC, AK |
| 10 | D10=MC(SR(SB(D9)))(+)k9 | SB, SR, MC, AK |
| 11 | C=SR(SB(D10))(+)k10 | SB, SR, AK |

FIG.10

| CLOCK | HAMMING DISTANCE OF CONTENT OF STORAGE DEVICE | |
|---|---|---|
| | P-BASED | C-BASED |
| 0, 1 | (P(+)k0)(+)P | (D1(+)k0)(+)D1 |
| 1, 2 | MC(SR(SB(D1)))(+)k1(+)D1 | $MC^{-1}(SR^{-1}(SB^{-1}(D2)))$(+)k1(+)D2 |
| 2, 3 | MC(SR(SB(D2)))(+)k2(+)D2 | $MC^{-1}(SR^{-1}(SB^{-1}(D3)))$(+)k2(+)D3 |
| 3, 4 | MC(SR(SB(D3)))(+)k3(+)D3 | $MC^{-1}(SR^{-1}(SB^{-1}(D4)))$(+)k3(+)D4 |
| 4, 5 | MC(SR(SB(D4)))(+)k4(+)D4 | $MC^{-1}(SR^{-1}(SB^{-1}(D5)))$(+)k4(+)D5 |
| 5, 6 | MC(SR(SB(D5)))(+)k5(+)D5 | $MC^{-1}(SR^{-1}(SB^{-1}(D6)))$(+)k5(+)D6 |
| 6, 7 | MC(SR(SB(D6)))(+)k6(+)D6 | $MC^{-1}(SR^{-1}(SB^{-1}(D7)))$(+)k6(+)D7 |
| 7, 8 | MC(SR(SB(D7)))(+)k7(+)D7 | $MC^{-1}(SR^{-1}(SB^{-1}(D8)))$(+)k7(+)D8 |
| 8, 9 | MC(SR(SB(D8)))(+)k8(+)D8 | $MC^{-1}(SR^{-1}(SB^{-1}(D9)))$(+)k8(+)D9 |
| 9, 10 | MC(SR(SB(D9)))(+)k9(+)D9 | $MC^{-1}(SR^{-1}(SB^{-1}(D10)))$(+)k9(+)D10 |
| 10, 11 | SR(SB(D10))(+)k10(+)D10 | $SR^{-1}(SB^{-1}(C))$(+)k10(+)C |

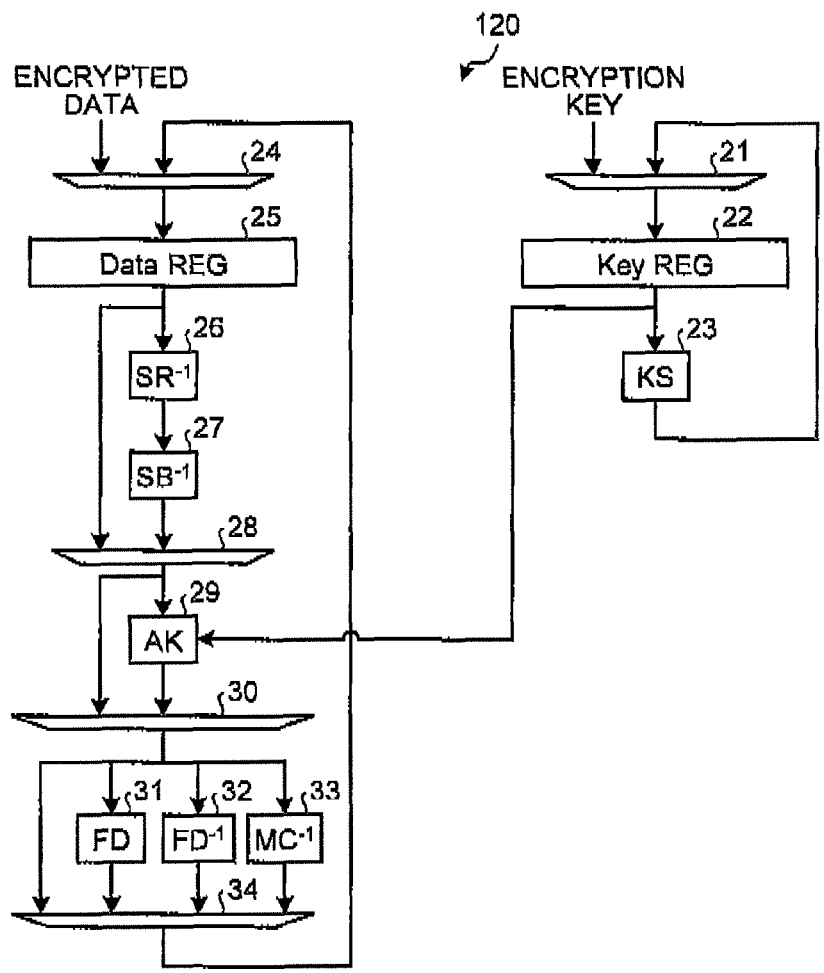

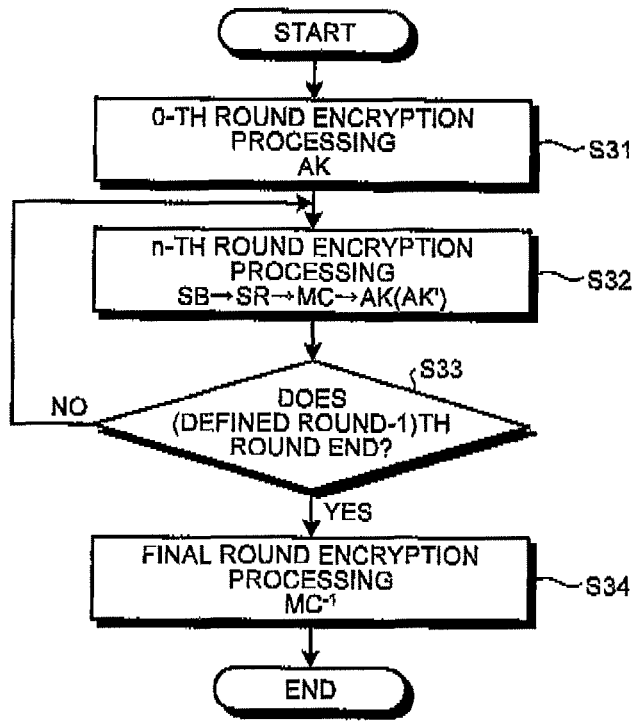
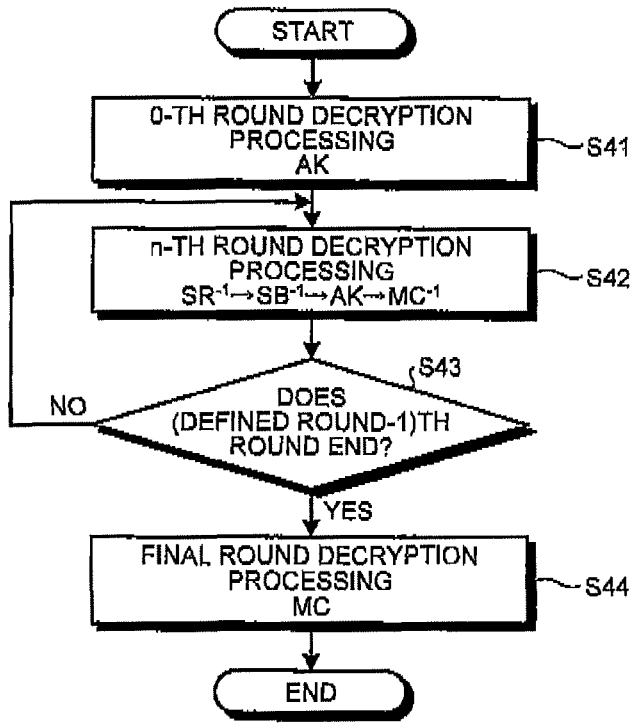

| CLOCK | HAMMING DISTANCE OF CONTENT OF STORAGE DEVICE | |
|---|---|---|
| | P-BASED | C-BASED |
| 10, 11 | FE(SR(SB(D9)))(+)k10(+)D10 | FE$^{-1}$(SR$^{-1}$(SB$^{-1}$(D11)))(+)k10(+)D11 |
| 11, 12 | FE$^{-1}$(D11)(+)D11 | FE$^{-1}$(C)(+)C |

ENCRYPTION DEVICE AND DECRYPTION DEVICE

CROSS-REFERENCE TO RELATED APPLICATIONS

This application is based upon and claims the benefit of priority from Japanese Patent Application No. 2010-210706, filed on Sep. 21, 2010; the entire contents of which are incorporated herein by reference.

FIELD

Embodiments described herein relate generally to an encryption device and a decryption device.

BACKGROUND

A high-functioning power system Advanced Metering Infrastructure (AMI, or smart meter) is attracting attention, which has a communication function and automatically transmits electric usage in a home or a business place to an electric company at a regular interval. A known Automated Meter Reading (AMR) system has been realized from the need of reduction in labor cost or reduction in operation cost. The AMI system has more functions than the AMR system. This enables bidirectional communication between equipment, such as an air conditioner or an illumination in the home or the business place, and a meter, or between the meter and the electric company. This also allows the optimization of the use of energy resources.

While the introduction of the AMI system is useful from the viewpoint of energy resources, it is necessary to provide a countermeasure against an intrusion of privacy and to sufficiently ensure the credibility (security) of information which is exchanged in the AMI system. In order to solve the problems regarding security, it is necessary to provide an encryption/decryption device.

The encryption/decryption device encrypts/decrypts plain data/encrypted data using a specific algorithm, making it possible to ensure the security of information. However, it has been reported that a countermeasure against a side channel attack, which does not leave a trace of attack, needs to be implemented for the encryption/decryption device. The side channel attack is a passive attack and includes Simple Power Analysis (SPA), Differential Power Analysis (DPA), and Electromagnetic Analysis (EMA), in which an internal private key is derived only by measuring power or electromagnetic waves in operation.

The side channel attack is realized by deriving a private key having high similarity to power consumption or electromagnetic waves which can be measured during the arithmetic operation of the encryption/decryption device and intermediate data which can be calculated from an estimated private key. An attack is possible because the key space of the estimated private key is small. In a known side channel countermeasure, intermediate data is disturbed by masking intermediate data using a random number device, making it difficult to perform high-similarity determination.

As described above, in order to solve the problems regarding security necessary for the AMI system, there is a need for an encryption/decryption device in which a side channel countermeasure is provided. Meanwhile, from the viewpoint of the effective utilization of energy resources, there is a need for a side channel countermeasure with power consumption lower than a mask countermeasure that has high power consumption and unsatisfactory energy efficiency.

However, since the random number generation processing is comparatively heavy processing, the method using a random number in the related art has a problem in that there is an adverse effect on speed, circuit size, power, processing performance, and the like.

BRIEF DESCRIPTION OF THE DRAWINGS

FIG. 6 is a flowchart showing an example of encryption processing in a typical encryption device;

FIG. 7 is a flowchart showing an example of decryption processing in a typical decryption device;

FIG. 9 is a diagram showing the content of data which is stored in a storage device at each clock;

FIG. 10 is a diagram showing the Hamming distance of the content of a storage device at continuous clocks;

FIG. 13 is a diagram showing a circuit configuration example of the decryption device of the first embodiment;

FIG. 14 is a diagram showing an example of MC;

FIG. 15 is a diagram showing an example of $MC^{-1}$;

FIG. 16 is a flowchart showing an example of encryption processing in the encryption device of the first embodiment;

FIG. 17 is a flowchart showing an example of decryption processing in the decryption device of the first embodiment;

DETAILED DESCRIPTION

Figure 1:
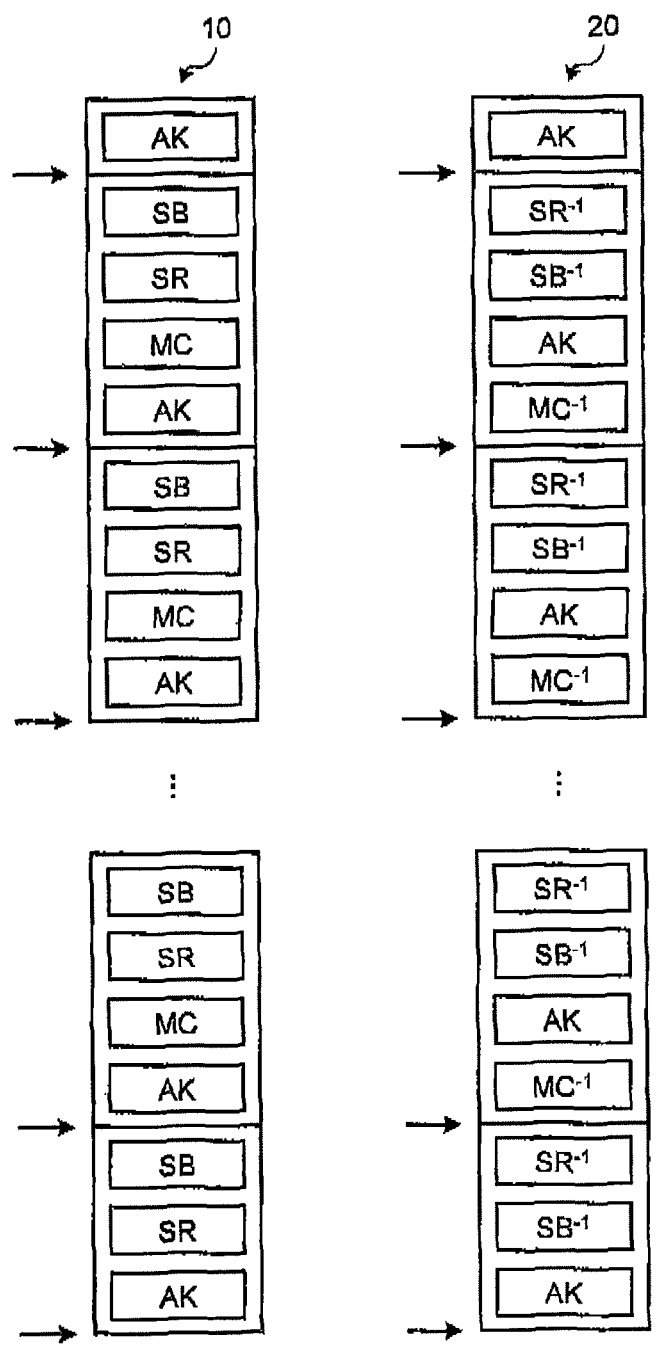
FIG. 1 is a diagram showing an example of a processing procedure in a data mixing unit of a typical encryption device and a data mixing unit of a typical decryption device.

In general, according to one embodiment, an encryption device includes a storage unit, an input unit, first to fourth partial encryption units, a generation unit, and an output unit. The first partial encryption unit calculates first intermediate data from input plain data to store in the storage unit. The generation unit generates a round key, which is used in calculations for the first intermediate data and N-th intermediate data, from the secret key. The second partial encryption unit calculates (i+1)th intermediate data from i-th intermediate data (i is smaller than N) and the round key to store in the storage unit. The third partial encryption unit performs an arithmetic operation including predetermined conversion for mixing the N-th intermediate data, and calculates (N+1)th intermediate data to store in the storage unit. The fourth partial encryption unit obtains encrypted data by performing an arithmetic operation including inverse conversion of the conversion on the (N+1)th intermediate data.

Hereinafter, embodiments of an encryption device and a decryption device will be described in detail with reference to the drawings.

First Embodiment

An encryption device and a decryption device according to a first embodiment change the processing sequence of an arithmetic operation defined by an encryption scheme such that the conditions under which a side channel attack is established are not satisfied. Thus, it is possible to realize an encryption device which is secure against a side channel attack, without generating a random number or the like.

The outline of a side channel attack will be described taking DPA as an example which is dangerous for an encryption device and a decryption device. The DPA is an attack that measures power consumption of a circuit, in which data processing has been performed, to statistically estimate a private key. An adversary makes an attack in the following sequence.

(1) The Hamming distance of data in arithmetic operation is predicted on the basis of the estimated private key (candidate key).

(2) The similarity between the measured power consumption and the Hamming distance data in predictive arithmetic operation is calculated.

(3) A candidate key having the highest similarity to a plurality of kinds of power consumption is determined to be a correct key.

Because it is difficult to determine a correct key in a large key space, it is necessary to estimate a private key in a small and limited key space. In the related art, the report shows that the candidate key space of the DPA is about eight bits in many cases.

The reason why the similarity to the Hamming distance of data in arithmetic operation is predicted is that power consumption depends on a variation in a logical element of hardware. The hardware includes a storage unit which stores data and a combination circuit for realizing an arithmetic operation. Variations in data vulnerable to a side channel attack significantly affect the storage unit. This is because the storage unit is synchronized with a clock, and thus data varies at the same timing. In contrast, data in arithmetic operation, which is estimated, does not vary at the same timing because the combination circuit depends on the logical element. Furthermore, the storage unit has higher power consumption than the combination circuit.

Hereinafter, an example will be described where encryption and decryption are carried out by an encryption device using block encryption which is represented by Advanced Encryption Standard (AES). In the example, the round function of AES or the like is used as partial encryption processing. The partial encryption processing represents processing which is performed during the encryption processing for calculating encrypted data from plain data. In the case of the AES, for example, a round function including SubstitutionBytes, ShiftRows, MixColumns, and AddRoundKey corresponds to the partial encryption processing.

For the block encryption scheme which is applied to this embodiment, the encryption device and the decryption device primarily include a key scheduling unit that receives a secret key as an input and outputs a plurality of round keys, and a data mixing unit that mixes input data. FIG. 1 is a diagram showing an example of a processing procedure in a data mixing unit 10 of a typical encryption device and a data mixing unit 20 of a typical decryption device.

The data mixing unit 10 of the encryption device includes AddRoundKey (AK) which calculates the exclusive OR of the round keys generated by the key scheduling unit (not shown) and data, SubstitutionBytes (SB) which carries out nonlinear conversion in units of eight bits, ShiftRows (SR) which shift data in units of bytes, and MixColumns (MC) which carries out linear conversion influential for every eight bit of the 32 bits. In FIG. 1, an arrow indicates the timing at which data as the result of each arithmetic operation is latched in the storage unit, such as a register.

Similarly, the data mixing unit 20 of the decryption device includes InverseSubstitutionBytes ($SB^{-1}$), InverseShiftRows ($SR^{-1}$), and InverseMixColumns ($MC^{-1}$) which are respectively inverse conversion of SB, SR, and MC, and AK.

A configuration example of each arithmetic operation which is used by the AES encryption scheme will be described with reference to FIGS. 2 to 5. Hereinafter, an example will be described where the key length is 128 bits.

Figure 2:
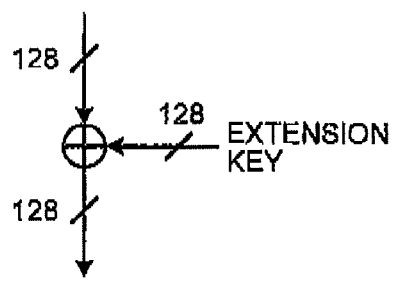
FIG. 2 is a diagram showing a configuration example of AK.

FIG. 2 is a diagram showing a configuration example of AK. As shown in FIG. 2, AK is an arithmetic operation for each bit to output 128-bit data which is the exclusive OR of the 128-bit round key and 128-bit input data.

Figure 3:
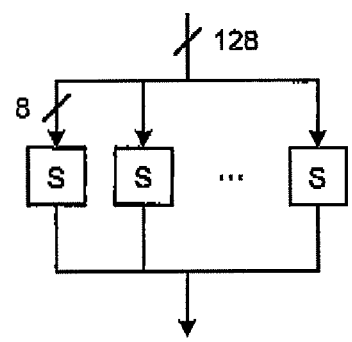
FIG. 3 is a diagram showing a configuration example of SB.

FIG. 3 is a diagram showing a configuration example of SB. As shown in FIG. 3, SB is an arithmetic operation which segments 128-bit input data into 16 pieces of eight-bit data and is carried out by a nonlinear conversion table S.

Figure 4:
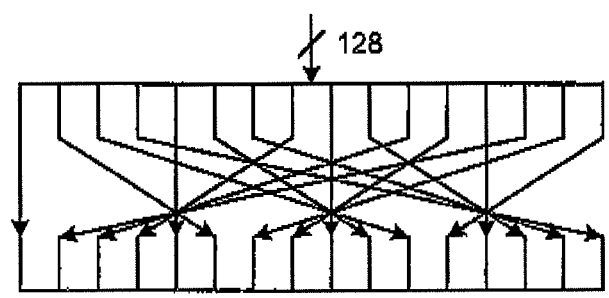
FIG. 4 is a diagram showing a configuration example of SR.

FIG. 4 is a diagram showing a configuration example of SR. As shown in FIG. 4, SR segments 128-bit input data into 16 pieces of eight-bit data and rearranges data. FIG. 4 shows a case where each piece of eight-bit data segmented from input data is rearranged to a position indicated by the head of the arrow.

Figure 5:
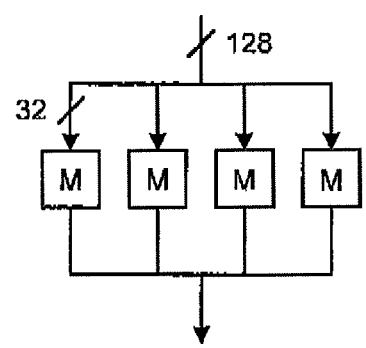
FIG. 5 is a diagram showing a configuration example of MC.

FIG. 5 is a diagram showing a configuration example of MC. As shown in FIG. 5, MC is an arithmetic operation which segments 128-bit input data into four pieces of 32-bit data and carries out linear conversion in units of 32 bits.

In the decryption processing of the AES encryption scheme, arithmetic operations, which are inverse conversion of the arithmetic operations of the encryption processing, are used. AK is the exclusive OR and is the same arithmetic operation during the decryption processing and the encryption processing. $SB^{-1}$ is an arithmetic operation by a nonlinear conversion table as inverse conversion of SB. $SR^{-1}$ is an arithmetic operation to shift input data as inverse conversion of SR. $MC^{-1}$ is processing in which inverse conversion of MC is carried out.

FIG. 6 is a flowchart showing an example of encryption processing in a typical encryption device. The encryption device carries out AK once in the initial round (0-th round) (Step S11). One round of the AES encryption scheme is carried out at one clock.

Next, the encryption device repeats the arithmetic operations in n rounds (1≤n<defined number of rounds) in order of SB, SR, MC, and AK (Step 312). The encryption device determines whether or not the arithmetic operation to the (defined number of rounds−1)-th round ends (Step S13). When the arithmetic operation does not end (No in Step S13), an encryption device 110 returns to Step S12, and the processing is repeated. When the arithmetic operation ends (Yes in Step S13), the encryption device carries out the arithmetic operation of SB, SR, and AK in the last round (defined round) in that order (Step S14).

FIG. 7 is a flowchart showing an example of decryption processing in a typical decryption device. The decryption device initially carries out AK once (Step S21). Next, the decryption device repeats the arithmetic operation in n rounds (1≤n<defined number of rounds) in order of $SR^{-1}$, $SB^{-1}$, AK, and $MC^{-1}$ (Step S22). The decryption device determines whether or not the arithmetic operation to the (defined number of rounds−1)th round end (Step S23). When the arithmetic operation does not end (No in Step S23), the encryption device 110 returns to Step S22, and the processing is repeated. When the arithmetic operation ends (Yes in Step S23), the decryption device carries out the arithmetic operation of $SR^{-1}$, $SB^{-1}$, and AK in the last round in that order (Step S24).

Figure 8:
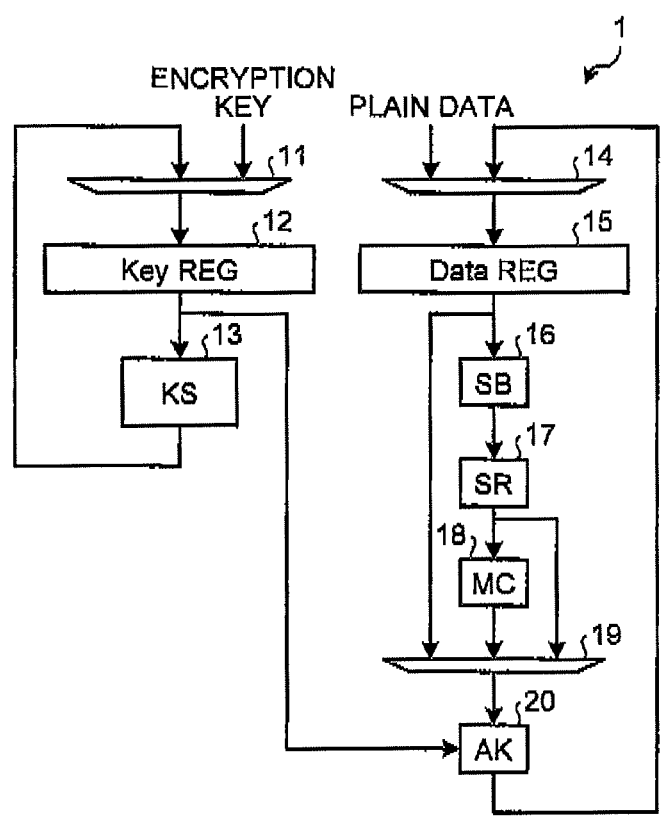
FIG. 8 is a diagram showing a circuit configuration example of a typical encryption device.

FIG. 13 is a diagram showing a circuit configuration example of the typical encryption device. FIG. 8 shows an example of an encryption device 1 of an AES encryption scheme having a key length of 128 bits. As shown in FIG. 8, the encryption device 1 includes a selector 11, KeyREG 12, key scheduling unit (KS) 13, a selector 14, DataREG 15, SB 16, SR 17, MC 18, a selector 19, and AK 20.

The selector 11, the selector 14, and the selector 19 select and output predetermined data at each cloak. KeyREG 12 is a storage unit (register) which stores a secret key selected by the selector 11. KS 13 calculates a round key, which is used in AK at each clock, from the key stored in KeyREG 12. DataREG 15 is a storage unit (register) which stores plain data or intermediate data output during the encryption processing.

The input plain data is stored in DataREG 15. At the first clock, only AK 20 is executed, and intermediate data which is the arithmetic operation result is stored in DataREG 15. At the second clock to the tenth clock, SB 16, SR 17, MC 18, and AK 20 are executed every time, and intermediate data is stored in DataREG 15. At the 11th clock, SE 16, SR 17, and AK 20 are executed, and encrypted data which is the arithmetic operation result is stored in DataREG 15. The round key which is used in AK 20 at each clock is calculated by KS 13 on the basis of the private key, and differs between the clocks.

In many cases, various encryption schemes as well as AES are realized by a combination of processing in units of eight bits and processing in units of 32 bits so that flexibility and high-speed can be achieved by hardware and software.

Symbols for simplifying description are defined. Plain data and encrypted data are respectively denoted by P (Plain data) and C (Cipher data). In each arithmetic operation, an input is denoted by x, an output is denoted by y, and the round key which differs between the clocks is denoted by k. In this case, AK is expressed by y=AK(x,k), SB is expressed by y=SB(x), SR is expressed by y=SR(x), and MC is expressed by y=MC(x).

FIG. 9 is a diagram showing the content of data which is stored in the storage device (DataREG 15) at each clock. FIG. 10 is a diagram showing the Hamming distance of the content of the storage device at continuous clocks. In FIG. 9, "A-B" means that "B" on the right side is stored in the storage device, instead of meaning that information itself is stored. For example, this means that, at the clock 1, "P+k0" is stored. In order to simplify the description of the stored content at a subsequent clock, "B" is represented by "A" on the left side.

In the DPA in which an attack is possible by measuring power consumption in arithmetic operation, a variation in data which is stored in the storage device is predicted by using the candidate key and the plain data or encrypted data, and a correct key is determined by the similarity to the obtained power consumption. Since power consumption is significantly influenced by a variation in data of the storage device, power consumption depends on the Hamming distance of the storage device shown in FIG. 10.

In order to determine whether or not the DPA is successful, it is necessary to easily determine the similarity. For example, it is necessary that the Hamming distance satisfies the following conditions.

(1) P or C is included
(2) only one kind of round key k is included
(3) linear conversion expressed by nine or more bits is not include (MC or $MC^{-1}$ is not included)
(4) only one SB or $SB^{-1}$ is included Only the Hamming weights at the clocks 10 and 11 satisfy all the conditions, and in this case, the DPA is successful. In other cases, an attack may be possible in principle. In this embodiment, it is assumed that the key space is an eight-bit space, and the arithmetic operation includes nonlinear conversion processing (conversion processing by the nonlinear conversion table S). In this case, if any one of the four conditions is not satisfied, an attack by DPA is difficult.

In the random number mask countermeasure of the related art, the Hamming weight is obtained from the candidate key, and it is necessary to predict random number dependence. Thus, this countermeasure is the countermeasure against the DPA. In this embodiment, the arithmetic operation is carried out in each round in the processing sequence such that the four conditions are not satisfied, realizing an encryption device and a decryption device with a compact countermeasure against a side channel attack.

Figure 11:
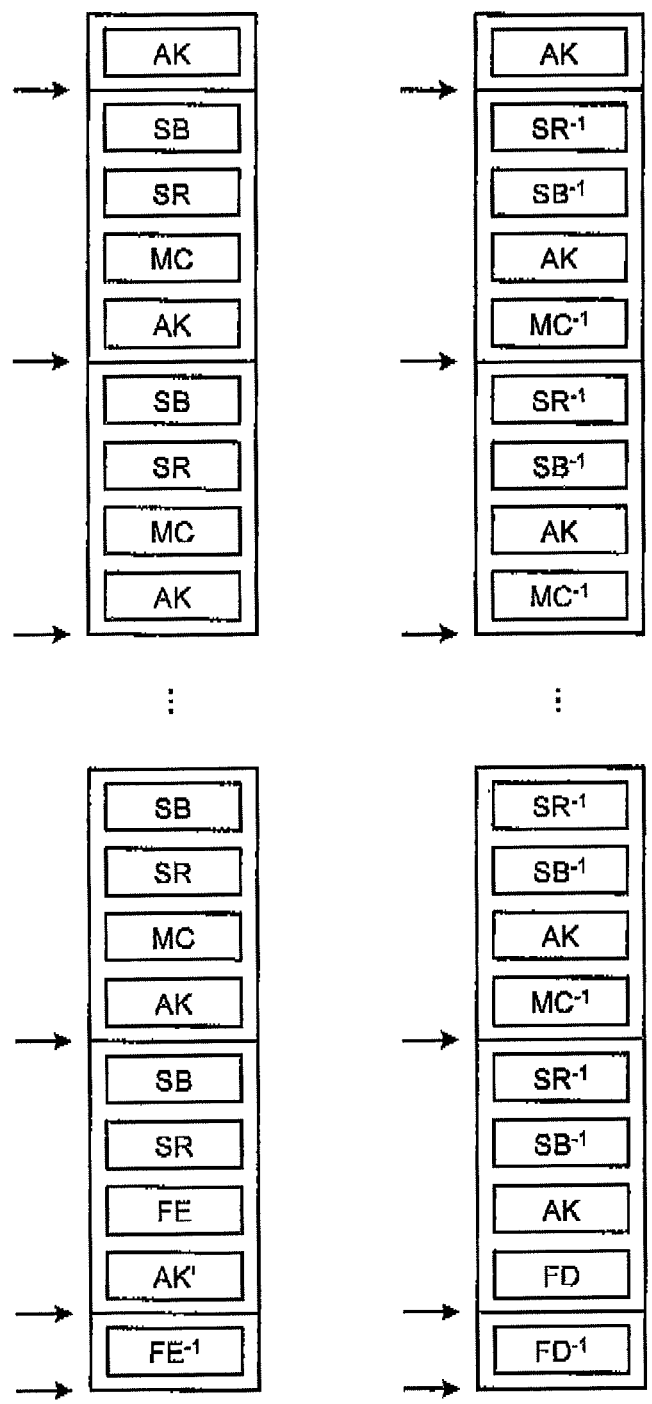
FIG. 11 is a diagram showing an example of a processing procedure in a data mixing unit of an encryption device and a data mixing unit of a decryption device according to a first embodiment.

FIG. 11 is a diagram showing an example of a processing procedure in a data mixing unit of the encryption device and a data mixing unit of the decryption device according to the first embodiment. In FIG. 11, a left view shows a processing procedure in the data mixing unit of the encryption device. In FIG. 11, a right view shows a processing procedure in the data mixing unit of the decryption device. Similarly to FIG. 1, in FIG. 11, an arrow indicates the timing at which data as the result of each arithmetic operation is latched in the storage unit, such as a register.

In the encryption processing, an input is latched in the register at the clock 0, and the arithmetic operation result of AK is latched in the register at the clock 1. The arithmetic operation results of SB, SR, MC, and AK are latched in the register at the clocks 2 to 10. The arithmetic operation results of SB, SR, FE, and AK are latched in the register at the clock 11. The arithmetic operation result of $FE^{-1}$ is latched in the register at the clock 12, and the result is output as encrypted data.

In comparison with FIG. 1, the arithmetic operation FE is further provided in the arithmetic operation at a clock corresponding to the last clock of FIG. 1, and a clock at which $FE^{-1}$ as inverse conversion is added is provided next to the relevant clock. For FE and $FE^{-1}$, for example, the relationship of the following expressions (1) and (2) can be used.

$$FE(x)=A(x+b)+c \qquad (1)$$

$$FE^{-1}(x)=A^{-1}(x+c)+b \qquad (2)$$

x is matrix-expression data of m (where m is equal to or greater than 9) rows and 1 column, and the matrix A is a square matrix (nonsingular matrix) having an inverse matrix $A^{-1}$. b and c can have the same matrix expression as x, and an arbitrary matrix may be used. The matrix of FE may be called a mixing matrix.

Figure 12:
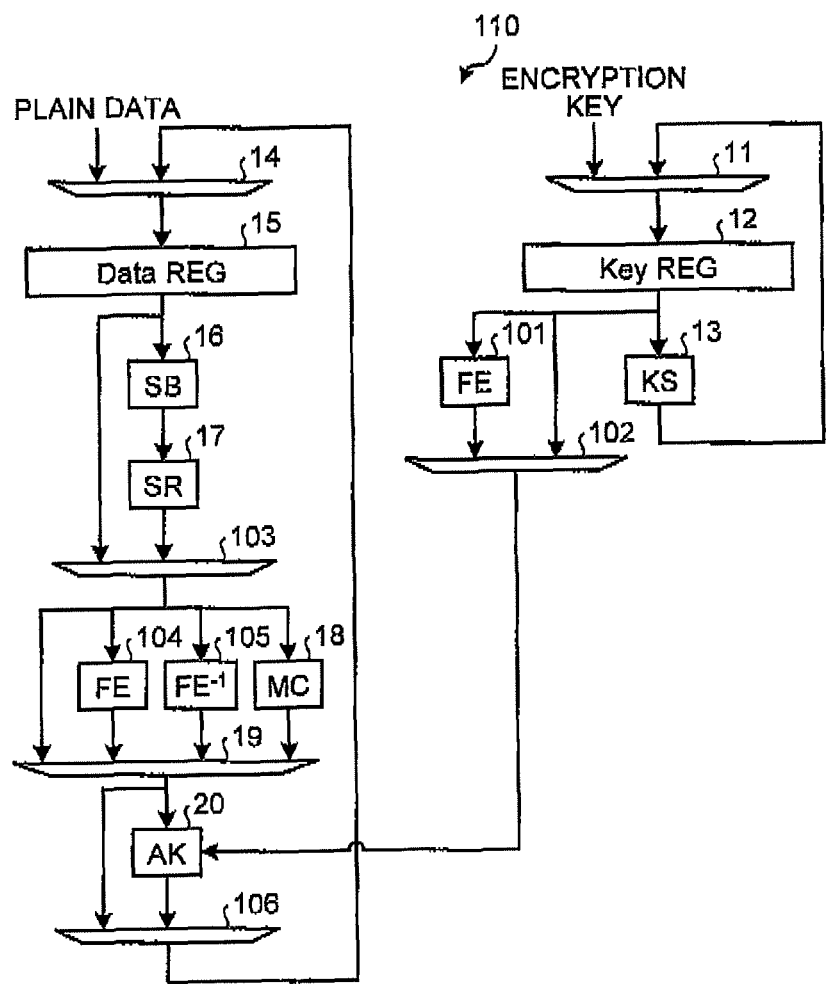
FIG. 12 is a diagram showing a circuit configuration example of the encryption device of the first embodiment.

FIG. 12 is a diagram showing a circuit configuration example of the encryption device of the first embodiment. As shown in FIG. 12, an encryption device 110 includes a selector 11, KeyREG 12, KS 13, a selector 14, DataREG 15, SB 16, SR 17, MC 18, a selector 19, AK 20, FE 101, a selector 102, a selector 103, FE 104, $FE^{-1}$ 105, and a selector 106.

The same components as those in FIG. 8 are represented by the same reference numerals, and description thereof will be omitted. The encryption device 110 is different from the encryption device 1 of FIG. 8 in that the selector 102, the selector 103, FE 104, $FE^{-1}$ 105, and the selector 106 are further provided.

The selector 102, the selector 103, and the selector 106 select and output predetermined data at each clock. Data which is selected at each clock is shown in FIG. 11, and description thereof will be omitted.

FE 101 and the selector 102 are provided so as to maintain the consistency to FE 104 which is executed at the clock 11. That is, at the clock 11, the selector 102 selects the arithmetic operation result of FE 101 on the round key calculated by KS 13.

The selector 19 selects the arithmetic operation result (denoted by FE(x)) of FE 104 at the clock 11. At the clock 11, AK 20 is executed on the arithmetic operation result FE(x). At this time, if the round key (denoted by k) calculated by KS 13 is used in the arithmetic operation of the exclusive OR on the arithmetic operation result FE(x) as it is, FE(x) (+)k is calculated. The symbol (+) means the exclusive OR. However, even when $FE^{-1}$ is applied at the next clock 12, it may be impossible to restore x(+)k, which is data to be originally restored, from FE(x)(+)k calculated in the above-described manner.

For this reason, at the clock 11, the selector 102 selects the arithmetic operation result of FE 101 on the round key k and outputs the result to AK 20. Thus, at the clock 11, FE(x)(+) FE(k) is calculated, and at the clock 12, $FE^{-1}$ is applied to the calculation result, thereby restoring x(+)k. In FIG. 11, in order to indicate a difference from AK at a different clock, the processing after FE at the clock 11 is denoted by AK'.

FIG. 13 is a diagram showing a circuit configuration example of the decryption device of the first embodiment. As shown in FIG. 13, a decryption device 120 includes a selector 21, KeyREG 22, KS 23, a selector 24, DataREG 25, $SR^{-1}$ 26, $SB^{-1}$ 27, a selector 28, AK 29, a selector 30, FD 31, $FD^{-1}$ 32, $MC^{-1}$ 33, and a selector 34.

The selector 21, the selector 24, the selector 28, the selector 30, and the selector 34 select and output predetermined data at each clock. KeyREG 22 is a storage unit (register) which stores the key selected by the selector 21. KS 23 calculates a round key, which is used in AK at each clock, from the key stored in the KeyREG 22. DataREG 25 is a storage unit (register) which stores encrypted data or intermediate data output during the decryption processing.

FD 31 carries out an arithmetic operation FD having an arithmetic operation $FD^{-1}$ as inverse conversion. $FD^{-1}$ 32 carries out the arithmetic operation $FD^{-1}$. With regard to the arithmetic operation FD and the arithmetic operation $FD^{-1}$, for example, the same arithmetic operations as FE and $FE^{-1}$ described above can be applied.

For FE and $FE^{-1}$, for example, MC and $MC^{-1}$ of AES can be used. FIG. 14 is a diagram showing an example of MC. FIG. 15 is a diagram showing an example of $MC^{-1}$. x which is the input of each of MC and $MC^{-1}$ can have matrix expression of 32 rows and 1 column.

Although the AES encryption scheme has heretofore been described as an example, the same method as in this embodiment can be applied insofar as an encryption method can be configured to include linear conversion, such as MC and $MC^{-1}$, which is represented by nine or more bits.

FIG. 16 is a flowchart showing an example of encryption processing in the encryption device 110 of this embodiment. FIG. 16 shows an example where MC is used as FE.

The encryption device 110 executes AK once in the initial round (0-th round) (Step S31). Next, the encryption device 110 repeats the arithmetic operation in n rounds (1≤n<defined number of rounds) in order of SB, SR, MC, and AK (Step S32). Only in the last round, AK' which is the exclusive OR with respect to the round key having passed through MC is carried out.

The encryption device 110 determines whether or not the arithmetic operation to the (the defined number of rounds−1) th round ends (Step S33). When the arithmetic operation ends (No in Step S33), the encryption device 110 returns to Step S32, and the processing is repeated. When the arithmetic operation ends (Yes in Step S33), the encryption device 110 carries out the arithmetic operation of $MC^{-1}$ in the last round (Step S34).

FIG. 17 is a flowchart showing an example of decryption processing in the decryption device 120. The decryption device 120 initially carried out AK once (Step S41). Next, the decryption device 120 repeats the arithmetic operation in n rounds (1≤n<defined number of rounds) in order of $SR^{-1}$, $SB^{-1}$, AK, and $MC^{-1}$ (Step S42). The decryption device 120 determines whether or not the arithmetic operation to the (the defined number of rounds−1)th round ends (Step S43). When the arithmetic operation does not end (No in Step S43), the decryption device 120 returns to Step S42, and the processing is repeated. When the arithmetic operation ends (Yes in Step S43), the decryption device 120 carries out the arithmetic operation of MC in the last round (Step S44).

SB and SR in each round can be substituted with each other, and $SB^{-1}$ and $SR^{-1}$ can be substituted with each other.

Figures 18, 19:
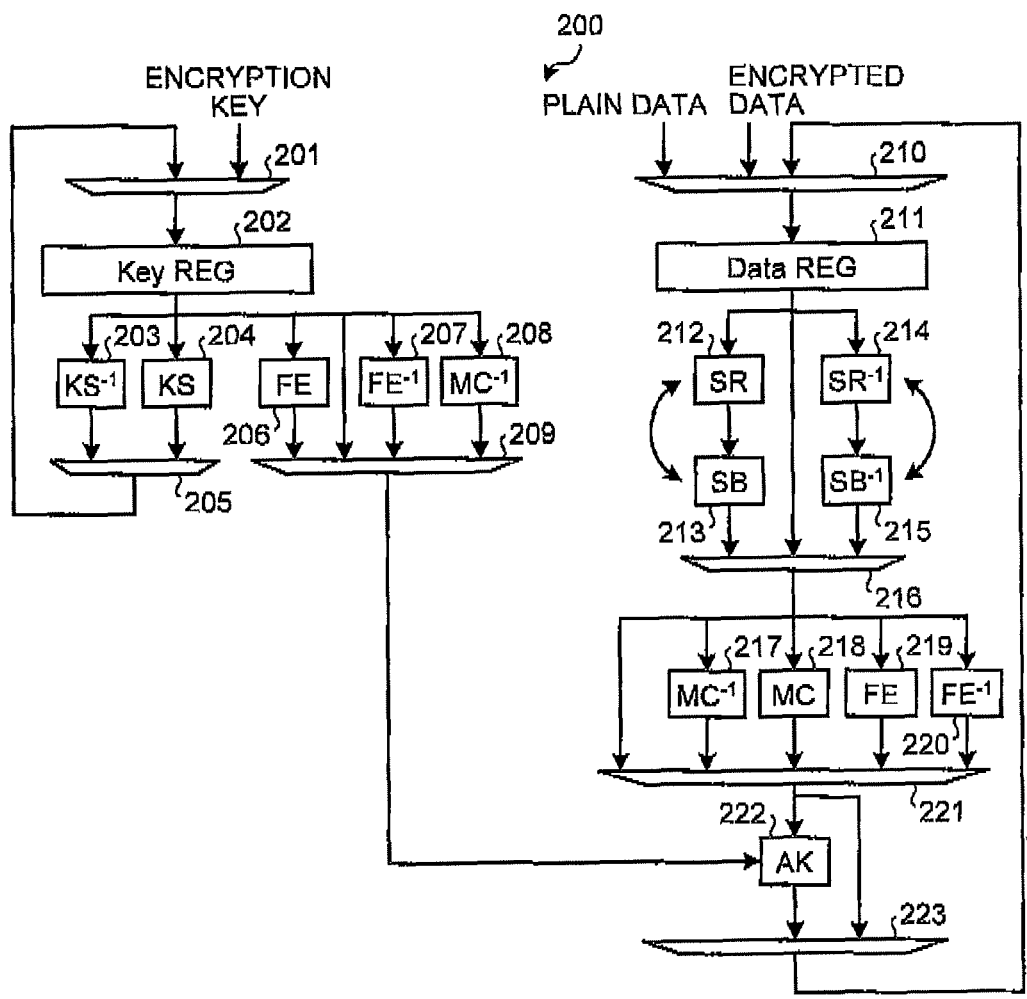
FIG. 18 is a diagram showing the Hamming distance of the content of a storage device at continuous clocks when the encryption processing procedure of FIG. 11 is used.
FIG. 19 is a diagram showing a circuit configuration example of an encryption/decryption device according to a second embodiment.

FIG. 18 is a diagram showing the Hamming distance of the content of the storage device at continuous clocks when the encryption processing procedure of FIG. 11 is used. As shown in FIG. 18, the Hamming distances between the clocks 10 and 11 and between the clocks 11 and 12 do not satisfy any one of the four conditions under which DPA is possible.

As described above, in the encryption device and the decryption device of the first embodiment, the processing sequence of the arithmetic operation defined by the encryption scheme can be changed such that the conditions under which a side channel attack is established are not satisfied. Therefore, an adverse effect on speed, circuit size, power, processing performance, and the like in the related art, in which a random number is generated, is not caused and it is possible to realize an encryption device and a decryption device which are secure against a side channel attack.

Second Embodiment

In a second embodiment, description will be provided as to a device (hereinafter, referred to as an encryption/decryption device) in which the circuits are shared by an encryption device and a decryption device.

FIG. 19 is a diagram showing a circuit configuration example of an encryption/decryption device 200 of the second embodiment. FIG. 19 is a diagram showing a circuit example using FE when decryption processing is further provided with an encryption circuit as a base.

The encryption/decryption device 200 includes a selector 201, KeyREG 202, $KS^{-1}$ 203, KS 204, a selector 205, FE 206, $FE^{-1}$ 207, $MC^{-1}$ 208, a selector 209, a selector 210, DataREG 211, SR 212, SB 213, $SR^{-1}$ 214, $SB^{-1}$ 215, a selector 216, $MC^{-1}$ 217, MC 218, FE 219, $FE^{-1}$ 220, a selector 221, AK 222, and a selector 223.

The selector 201, the selector 205, the selector 209, the selector 210, the selector 216, the selector 221, and the selector 223 select and output predetermined data at each clock. KeyREG 202 is a storage unit (register) which stores key selected by the selector 201. $KS^{-1}$ 203 and KS 204 calculate a round key, which is used in AK at each clock, from the key stored in KeyREG 202. $KS^{-1}$ 203 is inverse conversion of KS 204. DataREG 211 is a storage unit (register) which stores plain data, encrypted data, or intermediate data.

In the encryption processing, the arithmetic operation of AK is carried out at the first clock, the arithmetic operation is carried at the second to tenth clocks in order of SB, SR, MC, and AK, and the arithmetic operation is carried out at the 11th clock in order of SB, SR, FE, and AK'. At the 11th clock, the round key having passed through FE is used. At the 12th clock, the arithmetic operation of $MC^{-1}$ is carried out.

In the decryption processing, the arithmetic operation of AK is carried out at the first clock, the arithmetic operation is carried out at the second to tenth clocks in order of $SB^{-1}$, SR, $MC^{-1}$, and AK, and the arithmetic operation is carried out at the 11th clock in order of $SB^{-1}$, $SR^{-1}$, $FE^{-1}$, and AK. With regard to the round key which is used in the decryption processing of this embodiment, at the second to tenth clocks, the value having passed through $MC^{-1}$ is used, such that the same arithmetic operation result as the arithmetic operation sequence of FIG. 1 can be derived. With regard to the round key at the 11th clock, the round key having passed through $FE^{-1}$ is used. It should suffice that FE and $FE^{-1}$ can be inversely operated. Thus, when the arithmetic operation is carried out at the 11th clock during the encryption processing in order of SB, SR, $FE^{-1}$, and AK', only $FE^{-1}$ may have the round key.)

Figure 20:
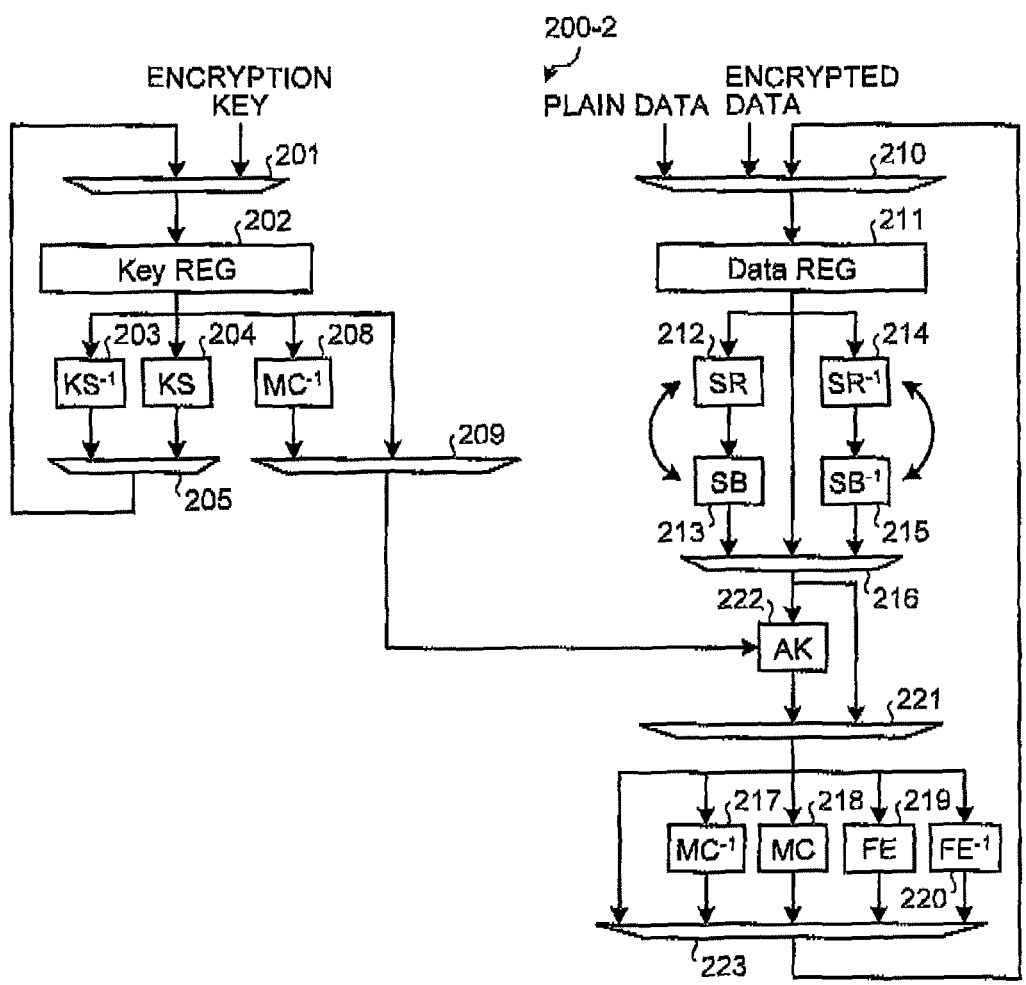
FIG. 20 is a diagram showing a circuit configuration example of an encryption/decryption device different from FIG. 19.

FIG. 20 is a diagram showing a circuit configuration example of an encryption/decryption device 200-2 different from FIG. 19. FIG. 20 is a diagram showing a circuit example using FE when encryption processing is further provided with a decryption circuit as a base.

In the encryption processing of the encryption/decryption device 200-2, the arithmetic operation of AK is carried out at the first clock, the arithmetic operation is carried out at the second to tenth clocks in order of SE, SR, AK, and MC, the arithmetic operation is carried out at the 11th clock in order of SB, SR, AK, and FE, and the arithmetic operation of $FE^{-1}$ is carried out at the 12th clock. At this time, with regard to the round key at the second to tenth clocks, the round key having passed through $MC^{-1}$ is used, such that the same arithmetic operation result as the arithmetic operation sequence of FIG. 1 can be obtained. With regard to the round key at the 11th clock, the same round key is used as it is.

In the decryption processing of the encryption/decryption device 200-2, the arithmetic operation of AK is carried out at the first clock, the arithmetic operation is carried out at the second to tenth clocks in order of $SB^{-1}$, $SR^{-1}$, AK, and $MC^{-1}$, the arithmetic operation is carried out at the 11th clock in order of $SB^{-1}$, $SR^{-1}$, AK, and $FE^{-1}$, and the arithmetic operation of FE is carried out at the 12th clock. At this time, with regard to the round key at the second to tenth clocks, the value obtained from the key scheduling unit (selector 209) may be used as it is.

Figure 21:
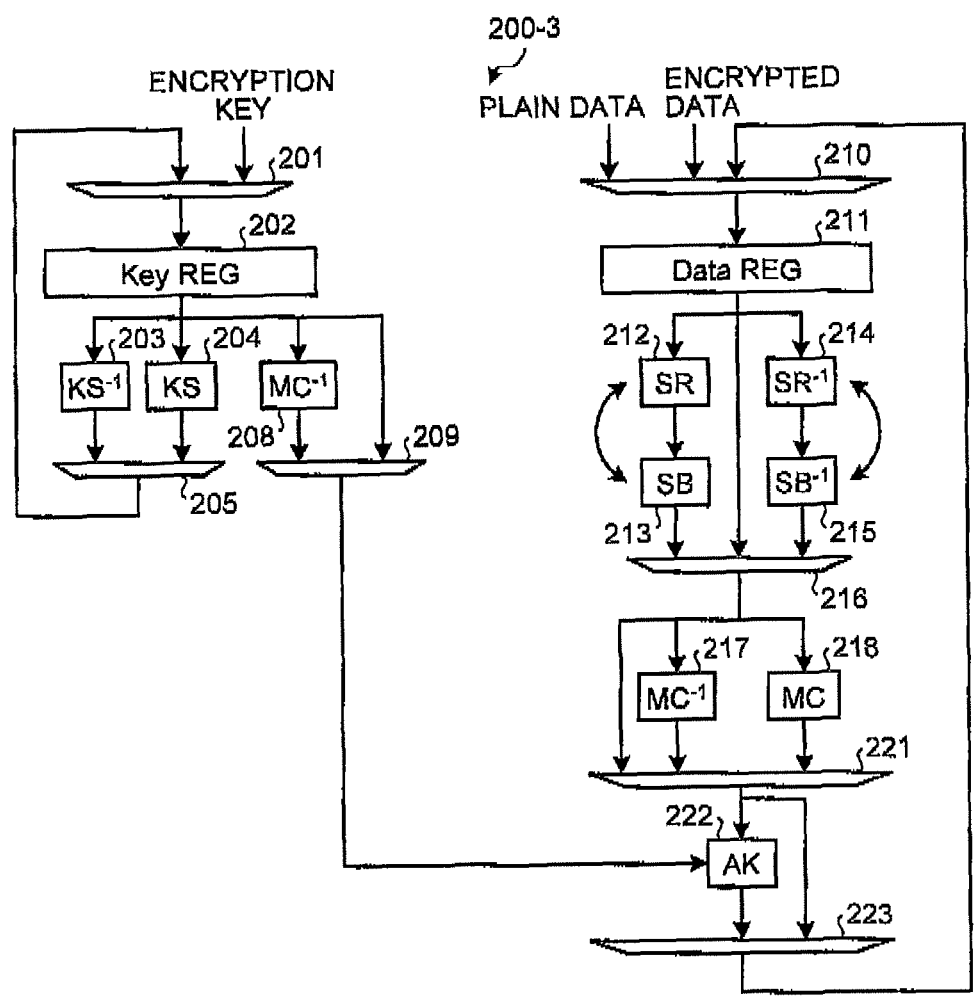
FIG. 21 is a diagram showing a circuit configuration example of an encryption/decryption device when MC is used as FE.
Figure 22:
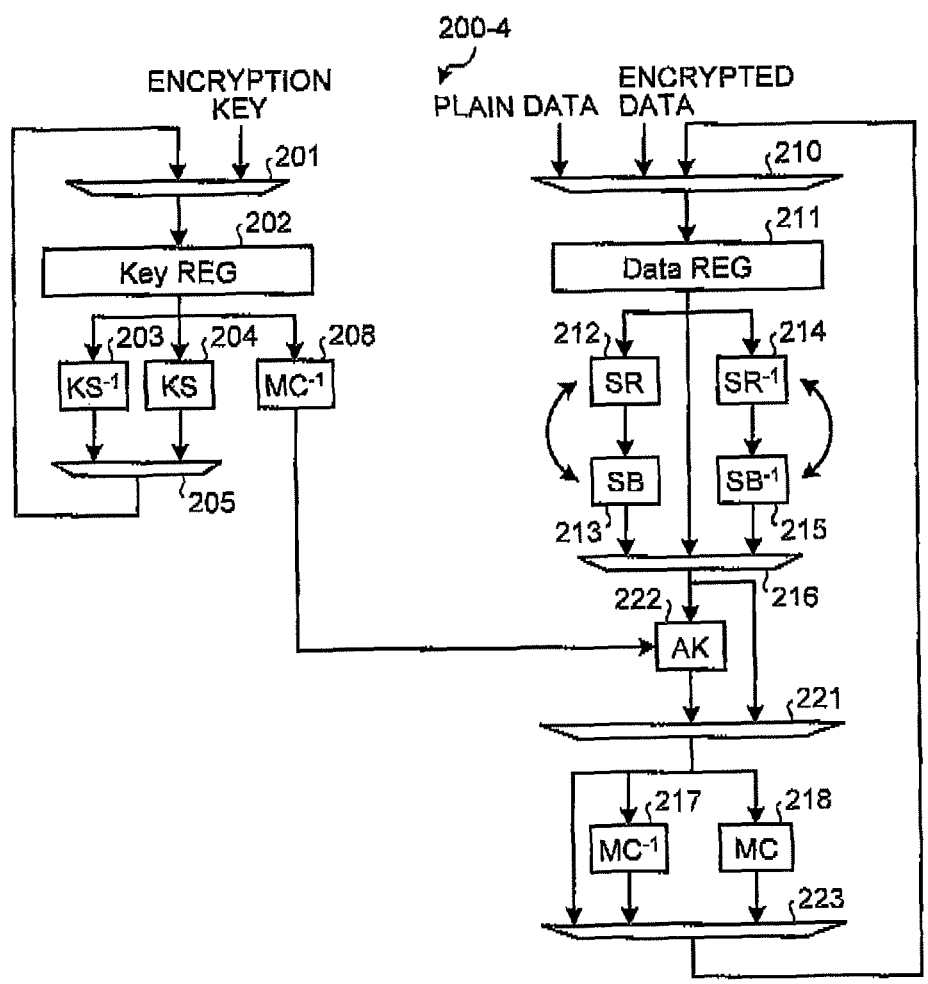
FIG. 22 is a diagram showing a circuit configuration example of an encryption/decryption device when MC is used as FE.

FIGS. 21 and 22 are respectively diagrams showing a circuit configuration example of an encryption/decryption device 200-3 and an encryption/decryption device 200-4 when MC is used as FE. FIGS. 21 and 22 respectively show examples where MC is applied to FE of FIGS. 19 and 20.

Figure 23:
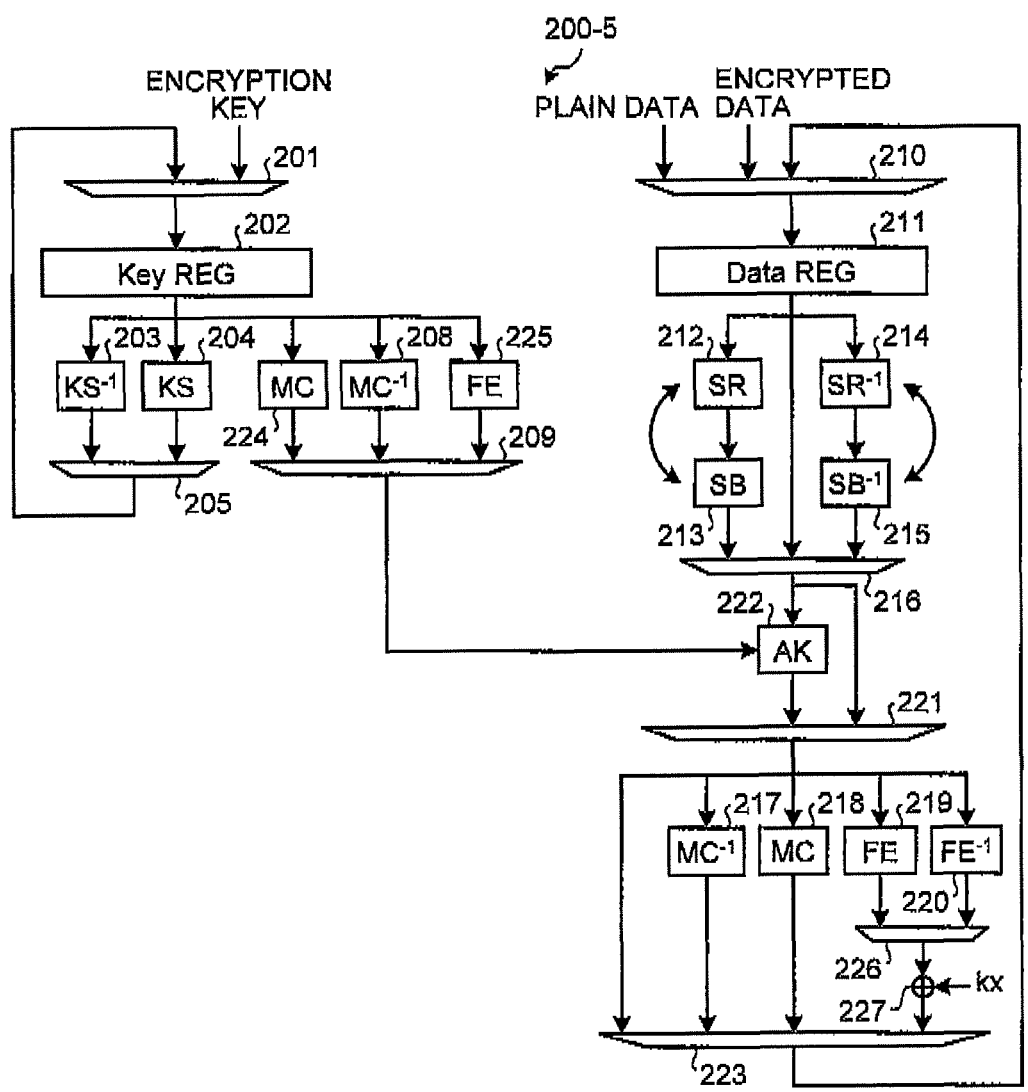
FIG. 23 is a diagram showing another circuit configuration example of an encryption/decryption device.

In the case of a circuit configuration in which MC and AK are substituted with each other, as a method of disabling a DPA attack, a method which introduces new confidential information (private key kx) may be used. FIG. 23 is a diagram showing a circuit configuration example of an encryption/decryption device 200-5 configured in such a manner. In the encryption/decryption device 200-5, MC 224, FE 225, a selector 226, and an exclusive OR operation unit 227 are further provided. With this configuration, for example, after FE 219 is carried out after AK 222 at the 11th clock of the encryption processing, the exclusive OR operation unit 227 calculates the exclusive OR of arithmetic operation result of FE 219 and the private key kx. Thus, there is a need for estimating, the private key kx, thereby disabling a DPA attack. The form where the exclusive OR with the private key kx is calculated is not limited to FIG. 23. For example, a mask (exclusive OR operation) is carried out by using a private key after DataREG 211, and the mask may be released after the selector 223.

As described above, in the second embodiment, it is possible to realize an encryption/decryption device in which the circuits are shared by the encryption device and the decryption device of the first embodiment.

Third Embodiment

Figure 24:
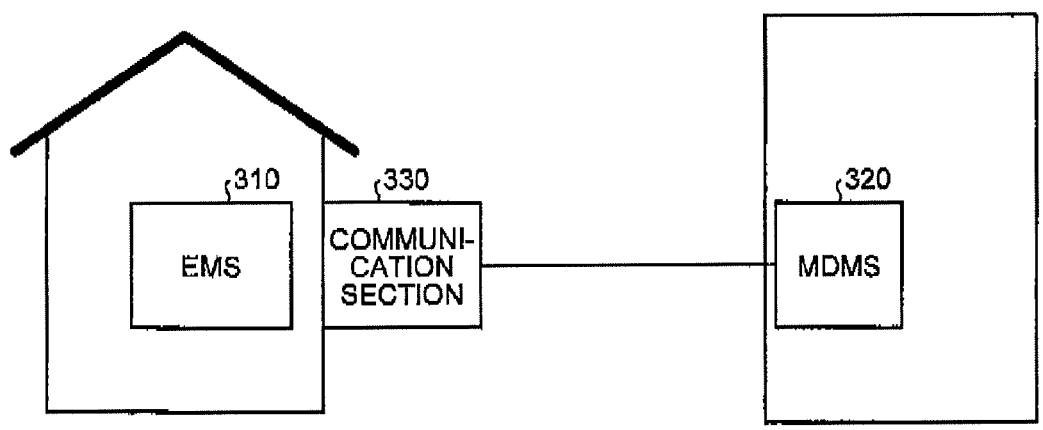
FIG. 24 is a diagram showing a configuration example of an AMI system according to a third embodiment.

In a third embodiment, description will be provided as to an example where an encryption device and a decryption device are applied to an AMI system. The AMI system to which the encryption device and the decryption device according to the first or second embodiment are applied can realize secure encrypted communication. FIG. 24 is a diagram showing a configuration example of the AMI system of the third embodiment.

An EMS (Energy Management System) 310 which is placed in the home and the building is connected to appliances and manages energy to be used. The EMS 310 distributes use information representing the amount of used energy or the like to an MDMS (Meter Data Management System) 320, which is managed by the electric company, through a communication section 330. At this time, it is preferable that encrypted communication is performed between the appliances, the EMS 310, the communication section 330, and the MDMS 320. In particular, it is necessary that encrypted communication is performed from the communication section 330 to the MDMS from the viewpoint of personal information protection. Thus, the encryption device of the above-described embodiment may be provided in the communication section 330 such that use information is transmitted to the MDMS 320 in an encrypted manner.

The EMS 310 may manage the use information of the appliances for several days. In this case, the encryption device of the above-described embodiment can be provided in the EMS 310, and the use information can be stored in the hard disk or the like in an encrypted manner. Thus, it is possible to prevent the use information from being easily falsified. The electric company should decrypt the encrypted use information of each user, thus it is necessary to provide a decryption device in the MDMS 320.

In the AMI system, a situation is considered in which energy is controlled by the electric company. Thus, the MDMS 320 further may include an encryption device, and encryption control information may be transmitted to homes and buildings in an encrypted manner. In this case, it is necessary that the communication section 330 includes a decryption device for decrypting encrypted encryption control information.

The AMI system is not limited to the above-described configuration. For example, some of the components may be eliminated as long as the AMI system is configured such that a pair of an encryption device and a decryption device is provided.

As described above, in the third embodiment, it is possible to prevent unauthorized use of data which is used in a high-functioning power system.

As described above, according to the first to third embodiments, without causing an adverse effect on speed, circuit size, power, processing performance, and the like, it is possible to realize an encryption device which is secure against a side channel attack.

Next, the hardware configuration of the device (the encryption device or the decryption device) according to each of the first to third embodiments will be described.

The device according to each of the first and second embodiments includes a control device, such as a CPU (Central Processing Unit), a storage device, such as a Read Only Memory (ROM) or a Random Access Memory (RAM), a communication I/F which is connected to a network and performs communication, an external storage device, such as a Hard Disk Drive (HDD) or a Compact Disc (CD) drive device, a display device, such as a display, an input device, such as a keyboard or a mouse, and a bus which connects the respective units, and can have the hardware configuration using a typical computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encryption device that performs encryption processing using a secret key and calculates a single encrypted data to be finally outputted as a result of the encryption processing from plain data, the encryption device comprising: one or more hardware processing comprising:
   a storage unit;
   an input unit that receives plain data;
   a first partial encryption unit that calculates first intermediate data from the plain data and stores the first intermediate data in the storage unit;
   a generation unit that generates a round key, which is used in calculations for the first intermediate data and N-th intermediate data (where N is an integer equal to or greater than 2), from the secret key;
   a second partial encryption unit that calculates (i+1)th intermediate data on the basis of i-th intermediate data (where i is an integer equal to or greater than 1 and smaller than N) and the round key, and stores the (i+1)th intermediate data in the storage unit;
   a third partial encryption unit that performs an arithmetic operation including predetermined conversion for mixing the N-th intermediate data, calculates (N+1)th intermediate data, and stores the (N+1)th intermediate data in the storage unit;
   a fourth partial encryption unit that obtains the single encrypted data to be finally outputted as the result of the encryption processing by performing an arithmetic operation including inverse conversion of conversions on the (N+1)th intermediate data; and
   an output unit that outputs the encrypted data.

2. The encryption device according to claim 1, wherein:
   the generation unit generates a conversion key that is converted by the conversion from the round key which is used in calculations for the N-th intermediate data, and
   the third partial encryption unit performs the arithmetic operation including the conversion and calculation using the conversion key that is carried out after the conversion, calculates (N+1)th intermediate data, and stores the (N+1)th intermediate data in the storage unit.

3. The encryption device according to claim 1, wherein:
   the third partial encryption unit performs the arithmetic operation including a calculation using the round key and the conversion that is carried out after the calculation using the round key, calculates the (N+1)th intermediate data, which is the exclusive OR of the arithmetic operation result and predetermined confidential information, and stores the (N+1)th intermediate data in the storage unit, and
   the fourth partial encryption unit performs the arithmetic operation including the inverse conversion on the (N+1)th intermediate data, and calculates encrypted data which is the exclusive OR of the arithmetic operation result and the confidential information.

4. The encryption device according to claim 1, wherein the conversion is conversion by a mixing matrix, and the inverse conversion is conversion by the inverse matrix of the mixing matrix.

5. A decryption device that performs decryption processing using a secret key and calculates single plain data to be finally outputted as a result of the decryption processing from encrypted data, the decryption device comprising: one or more hardware processor comprising:
   a storage unit;
   an input unit that receives encrypted data;
   a first partial encryption unit that calculates first intermediate data from the encrypted data and stores the first intermediate data in the storage unit;
   a generation unit that generates a round key, which is used in calculations for the first intermediate data and N-th intermediate data (where N is an integer equal to or greater than N), from the secret key;
   a second partial encryption unit that calculates (i+1)th intermediate data on the basis i-th intermediate data (where is an integer equal to or greater than 1 and smaller than N) and the round key, and stores the (i+1)th intermediate data in the storage unit;
   a third partial encryption unit that performs an arithmetic operation including predetermined conversion for mixing the N-th intermediate data, calculates (N+1)th intermediate data, and stores the (N+1)th intermediate data in the storage unit;
   a fourth partial encryption unit that obtains plain data to be finally outputted as the result of the decryption processing by performing an arithmetic operation including inverse conversion of conversions on the (N+1)th intermediate data; and
   an output unit which outputs the plain data.

6. The decryption device according to claim 5, wherein the conversion is conversion by a mixing matrix, and the inverse conversion is conversion by the inverse matrix of the mixing matrix.

* * * * *